United States Patent
Gilbert

(10) Patent No.: US 7,167,303 B2
(45) Date of Patent: Jan. 23, 2007

(54) MICROSCOPE

(75) Inventor: Manfred Gilbert, Schoeffengrund (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 127 days.

(21) Appl. No.: 10/529,540

(22) PCT Filed: Sep. 30, 2003

(86) PCT No.: PCT/EP03/50673

§ 371 (c)(1),
(2), (4) Date: Mar. 29, 2005

(87) PCT Pub. No.: WO2004/034120

PCT Pub. Date: Apr. 22, 2004

(65) Prior Publication Data

US 2006/0050372 A1    Mar. 9, 2006

(30) Foreign Application Priority Data

Oct. 2, 2002    (DE) .................. 102 46 277

(51) Int. Cl.
*G02B 21/00*    (2006.01)

(52) U.S. Cl. .................................................. 359/368
(58) Field of Classification Search ................ 359/368, 359/383
See application file for complete search history.

(56) References Cited

U.S. PATENT DOCUMENTS

| | | | | |
|---|---|---|---|---|
| 2,901,942 A * | 9/1959 | Tackaberry | ................. | 359/383 |
| 3,754,809 A * | 8/1973 | Harrison | .................... | 359/390 |
| 3,971,622 A * | 7/1976 | Yoshinaga | .................. | 359/390 |
| 3,997,239 A * | 12/1976 | Scherzer | ..................... | 359/381 |
| 4,168,881 A * | 9/1979 | Rosenberger | .............. | 359/381 |
| 4,277,133 A * | 7/1981 | Staehle | ....................... | 359/380 |
| 4,361,377 A | 11/1982 | Pullen | | |
| 5,127,614 A | 7/1992 | Etzold et al. | | |
| 5,585,964 A * | 12/1996 | Schalz | ........................ | 359/368 |
| 5,768,033 A * | 6/1998 | Brock | ......................... | 359/813 |
| 5,844,714 A * | 12/1998 | DiResta | ...................... | 359/368 |
| 2004/0114221 A1 * | 6/2004 | Piontkowsi et all | ........ | 359/376 |
| 2005/0083569 A1 * | 4/2005 | Pomerantz et al. | ......... | 359/368 |
| 2005/0213203 A1 * | 9/2005 | Harrison et al. | ............ | 359/383 |

FOREIGN PATENT DOCUMENTS

DE    22 17 102 A    11/1972

* cited by examiner

*Primary Examiner*—Mark A. Robinson
*Assistant Examiner*—Scott Stephens
(74) *Attorney, Agent, or Firm*—Simpson & Simpson, PLLC

(57) ABSTRACT

The invention relates to a microscope and a stand consisting of a first housing shell and a second housing shell. The first and second housing shells define a base part on which the stand rests. The stand is generally C-shaped, and a stand base cover closes the stand toward the outside. At least one connecting means is provided for the first and second housing shells. The connecting means is not accessible from outside the stand when the stand base cover is in place.

12 Claims, 6 Drawing Sheets

MICROSCOPE

CROSS REFERENCE TO RELATED APPLICATION

This application claims priority under International Application PCT/EP2003/050673, filed 30 Sep. 2003, which claims priority from German Application DE 102 46 277.1, filed 2 Oct. 2002.

TECHNICAL FIELD

The invention relates to a microscope the stand of which consists of a minimum number of shell parts. In addition, the stand of the microscope is provided with only a focus adjusting knob. Moreover, the microscope is narrow relative to the height of the stand, and the number of control elements is reduced to a minimum. The microscope has few corners and edges so that the risk of damage is considerably reduced. Furthermore, the viewing part is ergonomically disposed.

BACKGROUND OF THE INVENTION

U.S. Pat. No. 3,997,239 discloses a microscope consisting of shell shaped parts. The microscope stage is attached to an arm and by means of an eccentric disk can be moved in the direction of the optical axis of the microscope. Artificial illumination for the objects on the microscope stage is not provided. Moreover, the shaping of the shells also provides a tube sleeve for the microscope stage. The tube itself together with the optics can be inserted into the tube sleeve. The optical axis of the tube is perpendicular to the surface of the microscope stage. Furthermore, the shells carry a turret with objectives the optical axes of which are parallel to the optical axis of the tube. By the vertical arrangement of the tube, no attention is paid to the user's viewing ergonomy.

U.S. Pat. No. 4,361,377 also describes a portable and compact microscope that on the housing is provided with a multiplicity of setting elements. The specimen to be examined is introduced through a slot in the housing. Illumination is provided by a conventional incandescent lamp that can be connected to a battery acting as the power supply. The housing consists of two shells connected to each other by a screw. The microscope disclosed by this patent is quadrangular, and the specimen holders to be examined are pushed into the housing. The microscope does not have the conventional C-shaped stand and it also does not permit the examination of specimens on different specimen holders, because the microscope stage is not adjustable.

U.S. Pat. No. 5,844,714 discloses a portable microscope that must be assembled from a multitude of individual components in order to be able to view an object. The object is fastened to a swivelable arm so that focusing can be achieved by appropriate swiveling. The microscope is difficult to handle, and furthermore the risk exists that some components may get lost. This microscope is not suited for fast and routine examinations.

U.S. Pat. No. 5,127,614 discloses a microscope stand built on the modular principle. The column and the arm which, for example, carries the tube are cast components. The base of the stand is designed so that it surrounds the column. The microscope proposed in this patent, however, is not intended to be a portable microscope.

SUMMARY OF THE INVENTION

The object of the present invention is to provide a microscope that consists of few components and overall has a flat configuration. Moreover, the shape of the microscope is such that the cleaning of the microscope is markedly facilitated. This objective is reached by means of a microscope having a stand consisting of a first housing shell and a second housing shell. The stand supports a microscope stage with an adjustable height. The first and second housing shells define a base part on which the stand rests. The stand is generally C-shaped. There is provided a stand base cover which closes the base part of the stand toward the outside, and at least one connecting means for the first and the second housing shells. The connecting means is inaccessible from outside the stand when the stand base cover is in place.

The invention has the advantage that the stand of the microscope consists of a first housing shell and a second housing shell. Furthermore, the first and second housing shells define a base part on which the stand rests. The stand is C-shaped, and the base part is closed toward the outside by a stand base cover. Moreover, a connecting means is provided on the inside of each of the first and second housing shells, the connecting means cooperate with each other in an appropriate manner. When the stand base cover is in place, the connecting means are not accessible from outside the stand. Before the stand base cover is fastened, the connecting means are fixed. The fixing can be achieved, for example, by means of a screw. The assembled first or second housing shells define a recess into which the microscope stage can be placed and the height thereof varied by means of an adjusting knob. In the first and second housing shells, an opening is provided for the adjusting knob. Through the opening passes a shaft on which is disposed an eccentric disk by means of which the height of the microscope stage can be adjusted. It is also advantageous that the stand of the microscope consists of only three housing parts. In addition, the outer contour of the microscope is not disturbed by any connecting means. This facilitates the cleaning of the microscope considerably. In addition, the overall microscope structure is flat so that the microscope can readily be transported in a carrying case having the dimensions of a conventional attaché case. Moreover, the carrying case can also be provided with holders for the microscope slides, interchangeable objectives, preparation agents or replacement parts.

Other advantageous embodiments of the microscope are characterized wherein the cooperating first and second housing shells define a recess capable of receiving the microscope stage the height of which can be adjusted with an adjusting knob. An opening is provided for the adjusting knob in the first and the second housing shells.

The Microscope includes a screw for connecting the connecting means for the first an the second housing shells and that tightening with a mounting means can be performed through the base part of the stand so that the outer contour of the stand is undisturbed.

The stand may also have an opening for an eyepiece tube and a holder for at least one objective. A single objective or an objective turret can be disposed in the holder. The eyepiece tube defines an optical axis. At least one of the objectives in the work position defines an optical axis of the eyepiece, and that the optical axis of the eyepiece and the optical axis of the objective are disposed at an obtuse angle ($\alpha$). The obtuse angle ($\alpha$) is formed between the optical axis of the at least one objective and the optical axis of the eyepiece.

Other features of the microscope of the invention may include those wherein in the inside of the first or the second housing shell is provided with an optical deflection means configured so that the image of the specimen seen by the user has the same orientation as the specimen itself. The optical deflecting means may be a mirror system or a prism.

The dimensions of the stand together with the microscope stage and the adjusting knob are smaller than those of a conventional carrying case. The carrying case consists of a first and a second part. Each of the first and second parts of the carrying case may be provided with a protective transport device for the microscope. The protective transport devices are configured as part of a negative impression of the microscope.

BRIEF DESCRIPTION OF THE DRAWINGS

The subject matter of the invention is schematically represented in the drawings and will be described in greater detail by reference to the figures. The figures show the following.

DESCRIPTION OF THE PREFERRED EMBODIMENTS

Figure 1:
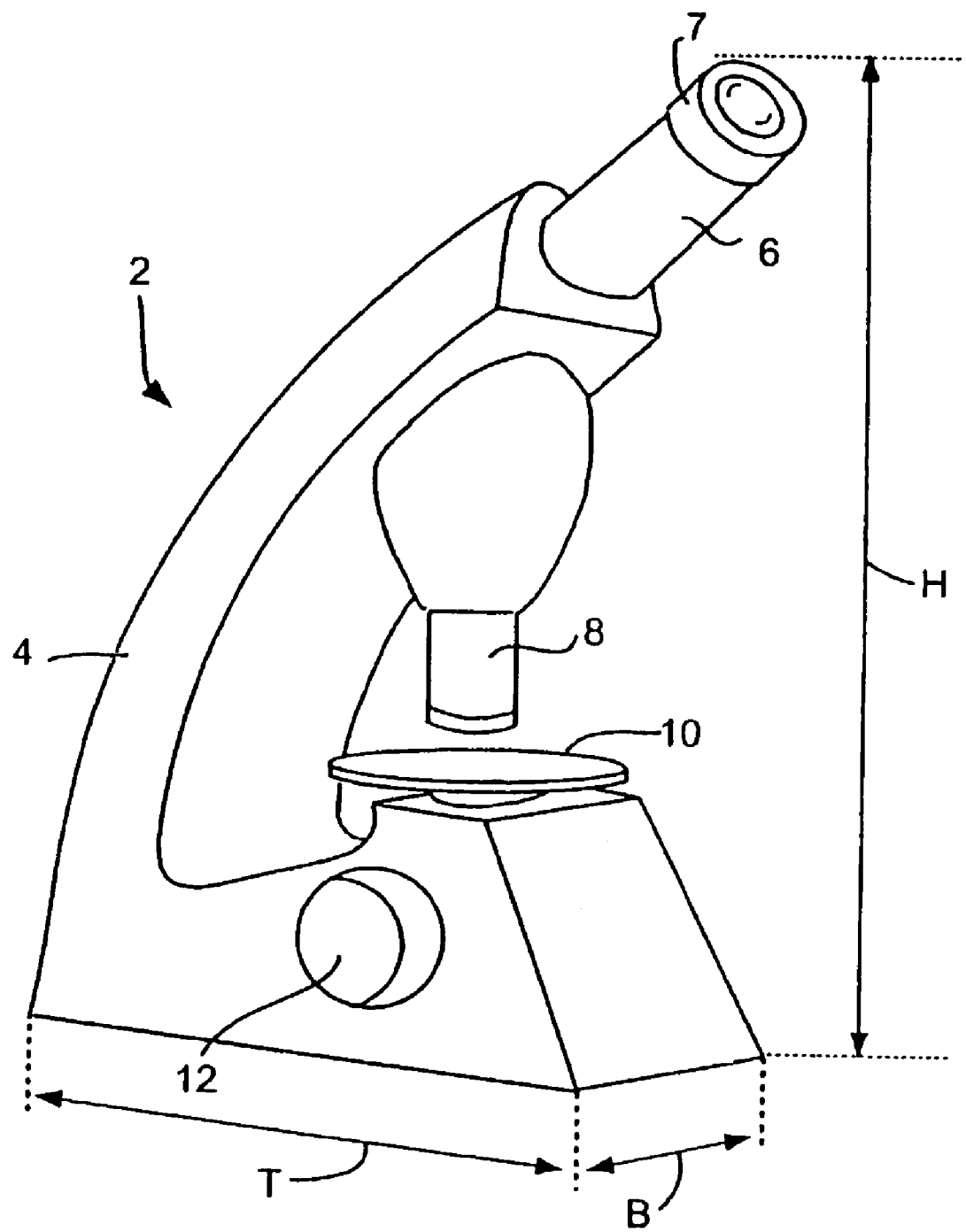
FIG. 1 is a view in perspective of the microscope.

In FIG. 1, the microscope 2 is shown in perspective. The microscope comprises a stand 4 on which there is provided an eyepiece tube 6, at least one objective 8 and a microscope stage 10 with an adjustable height. The at least one objective 8 defines an optical axis 13 (see FIG. 3). An eyepiece 7 is inserted into eyepiece tube 6. Eyepiece 7 also defines an optical axis (9) (see FIG. 3). Moreover, on each side of stand 4 there is provided an adjusting knob 12 with which the height of microscope stage 10 can be adjusted relative to objective 8. Microscope 2 has a height H, a width B and a depth T selected so that said microscope 2 can be transported in a conventional attaché case 14 (see FIG. 6). By conventional attaché case 14 is meant a briefcase about 48 cm wide, about 36 cm high and about 11 cm deep.

Figure 2:
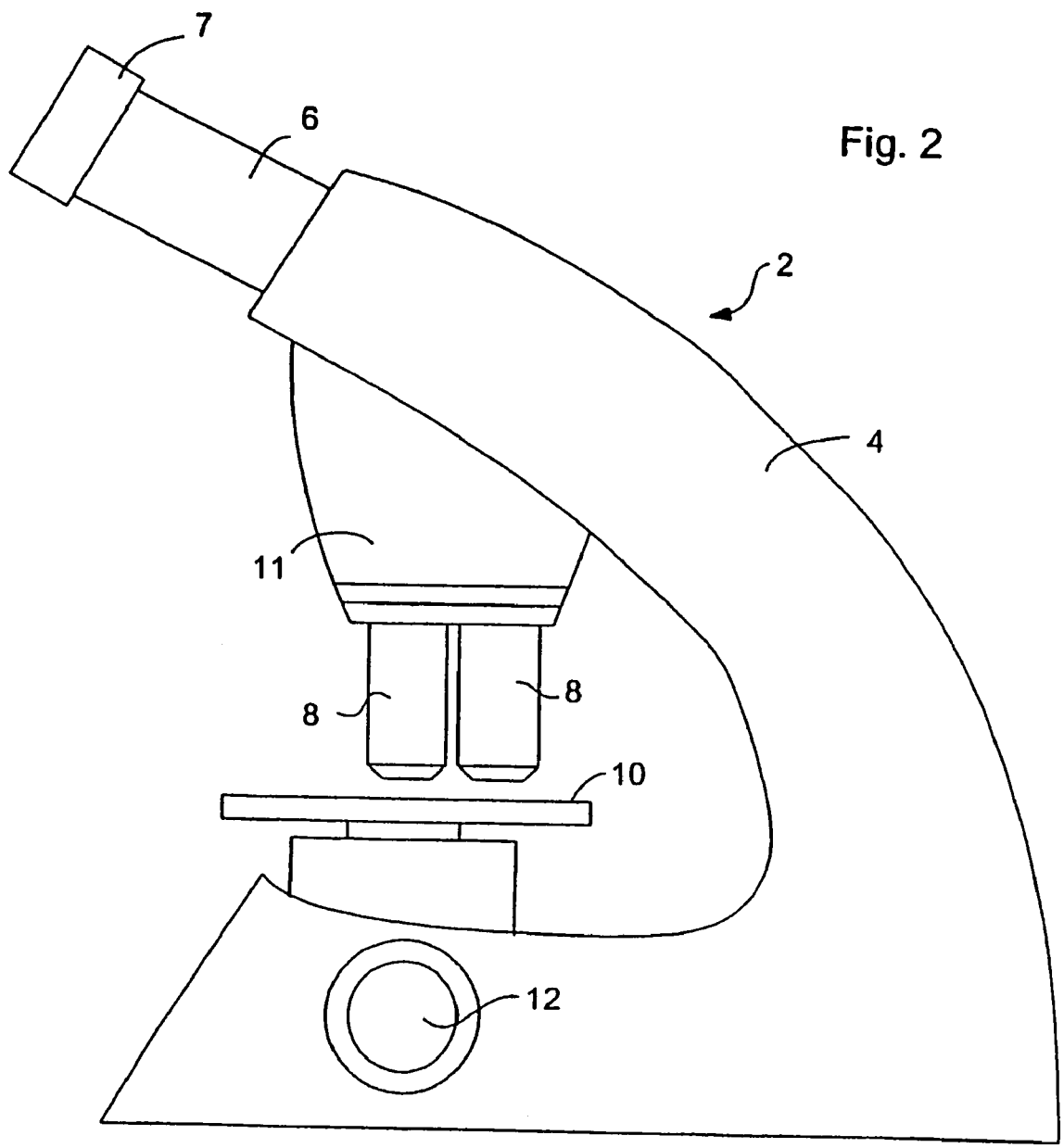
FIG. 2 is a side view of another exemplary embodiment of the microscope.

FIG. 2 shows a side view of a second exemplary embodiment of microscope 2. Here is provided an objective turret 11 which carries several interchangeable objectives 8. Other mechanical configurations of objective turret 11 are conceivable and are known to a person skilled in the art. Finally, it is critical that it be possible, by means of objective turret 11, to bring one of the objectives 8 into the work position. In this manner, a specimen (not shown) disposed on the microscope stage 10 can be viewed and examined. As already stated, microscope stage 10 can be moved relative to the objective by means of adjusting knob 12.

Figure 3:
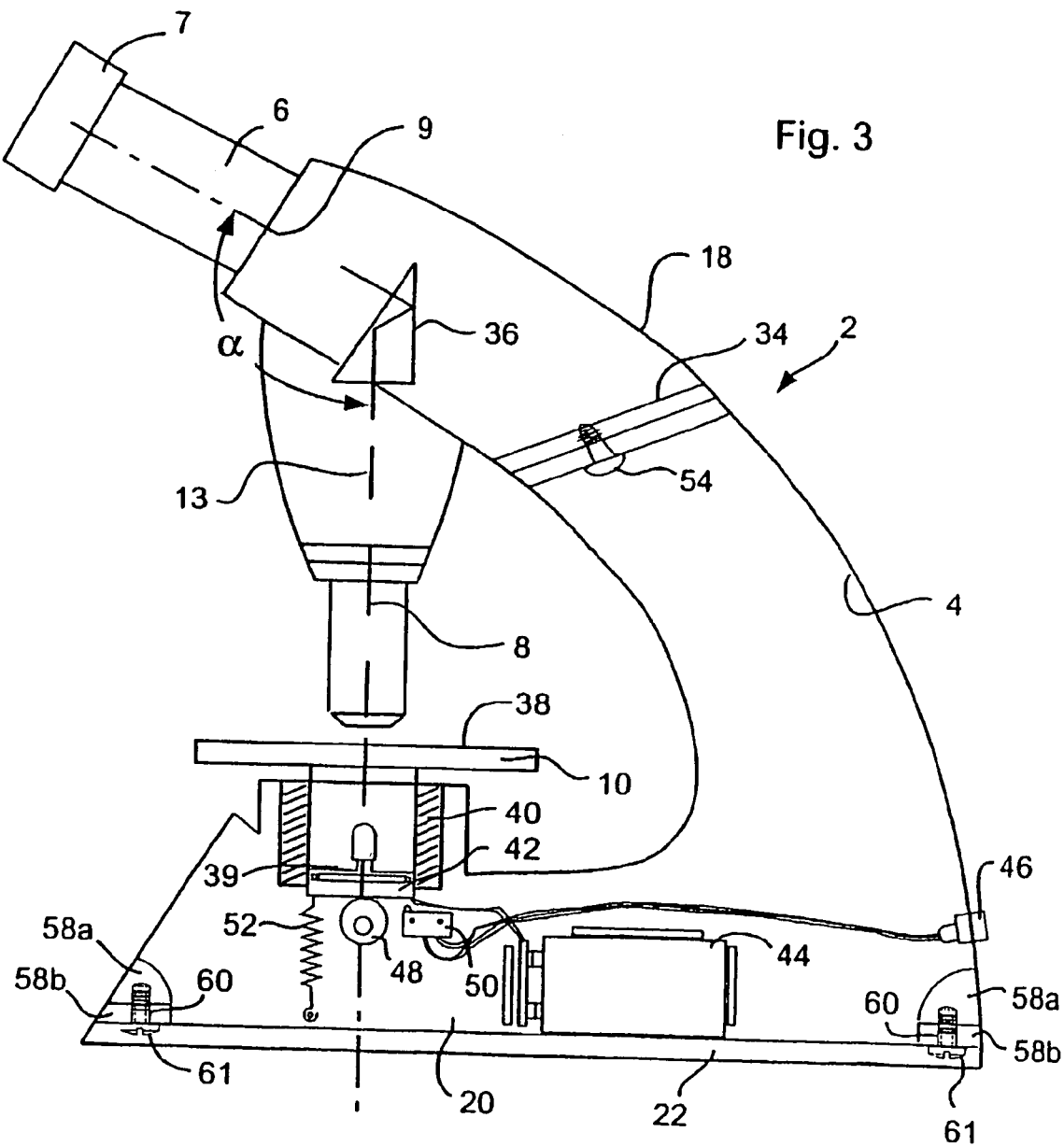
FIG. 3 is a side view of the microscope from which one housing part has been removed to show the inside of the stand.

FIG. 3 shows a side view of microscope 2 with one housing part removed so that the inside of stand 4 can be seen. Stand 4 essentially consists of a first and a second housing shell 16 and 18 (see FIG. 4). Stand 4 is C-shaped and rests on a stand base cover 22 which is connected with a base part 20 of stand 4. Base part 20 which, too, is formed by the first and second housing shell 16 and 18 is closed by stand base cover 22. Before stand base cover 22 is installed, the first and second housing shell 16 and 18 are connected to each other with at least one connecting means 34. Connecting means 34 are disposed inside the first and the second housing shell 16 and 18 and they are connected to each other by means of a screw 54. Screw 54 cannot be seen from outside stand 4 so that the outside shape of stand 4 is not disturbed by any screw connections. On the inside of, for example, the second housing shell 18 there is also disposed an optical deflecting means 36. Optical deflecting means 36 is required, because optical axis 9 of eyepiece 7 inserted into eyepiece tube 6 and optical axis 13 of objective 8 that is in the work position form an angle α. Angle α is an obtuse angle to provide an ergonomical viewing position for the user. Optical deflecting means 36 is therefore configured in a manner such that the user sees an image of the specimen that has the same orientation as the specimen itself. Objective 8 can be a single objective. Objective 8 can also be attached to a turret 11 to enable the user to vary magnifications quickly. Microscope stage 10 is provided opposite base part 20. Microscope stage 10 is a single unit consisting of a specimen support part 38 and a cylindrical guide part 40. Cylindrical guide part 40 is closed on one side by a base 42 and on the other side by specimen support part 38. Base 42 comprises an illumination module 39 (electronics and light source). Specimen support part 38, cylindrical guide part 40 and base 42 are glued together to form a single unit. This ensures simple and inexpensive assembly of the entire microscope 2. In base part 20 of stand 4 there is disposed a battery 44 serving as power supply for illumination module 39. Inexpensive regulation (not shown) can be provided for the light intensity of illumination module 39. Regulation can be accomplished simply by use of a potentiometer. Illumination module 39 of microscope 2 comprises at least one white LED. Battery 44 can also be in the form of a storage battery. In another exemplary embodiment of microscope 2, a socket can be provided for an external power supply. To adjust the height of microscope stage 20, there is provided an eccentric disk 48 the height of which relative to objective 8 can be varied by means adjusting knob 12 (FIG. 1). An elastic element 52 is connected with the inside of housing shell 18 and base 42 of the microscope stage. Said element provides a resetting force for microscope stage 10 and when the eccentric disk is lowered returns said microscope stage to recess 28 (see FIG. 4). Moreover, an on/off switch 50 is provided in a manner such that it can be actuated when microscope stage 10 is lowered or raised. The power supply for illumination module 39 is turned off or turned on by the on/off switch 50. Elastic element 52 can be a coil spring or a rubber band.

Figure 4:
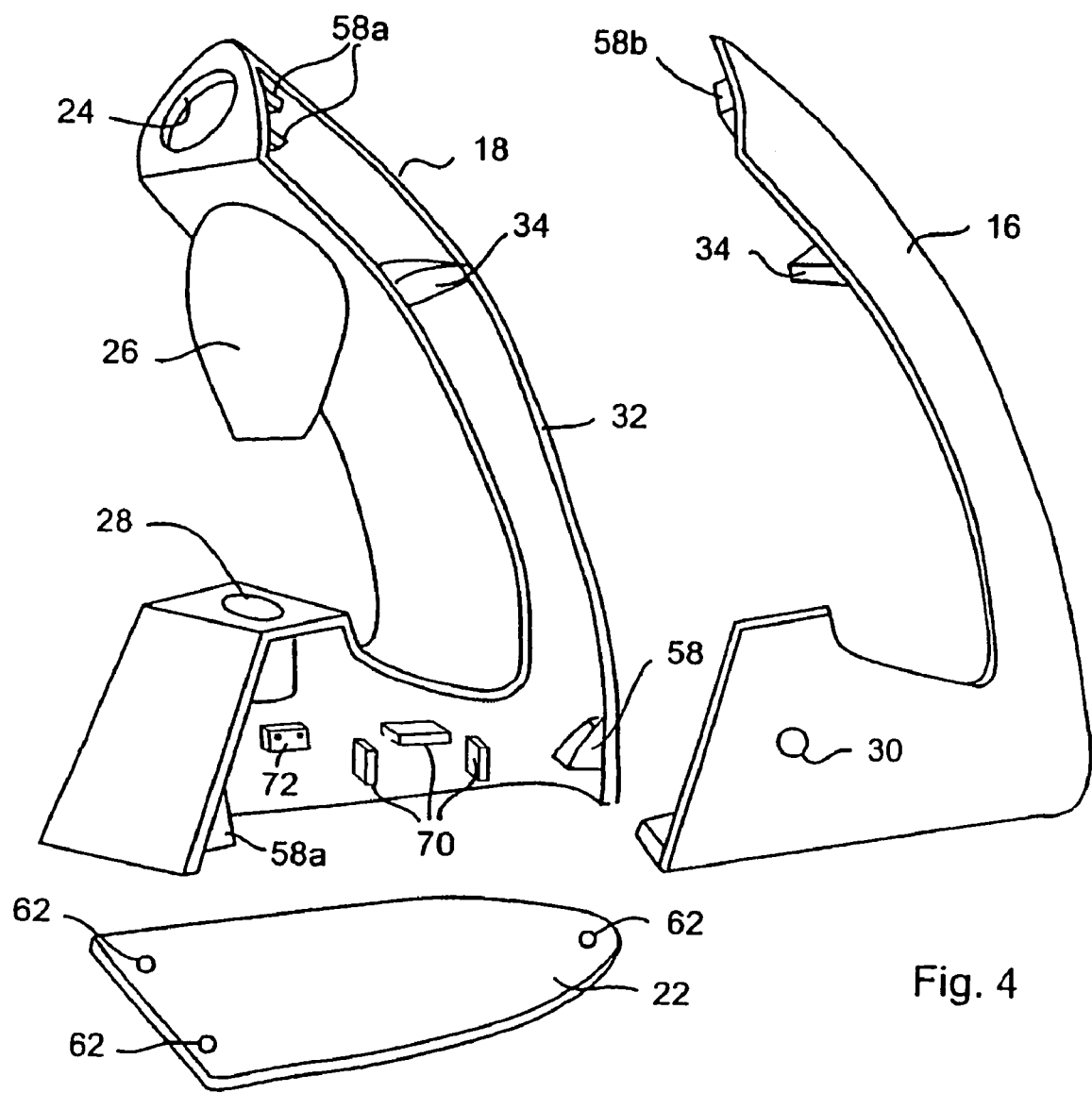
FIG. 4 is an exploded view of the stand consisting of a first and a second housing shell and the base.

As also shown in FIG. 4, stand 4 has an opening 24 for eyepiece tube 6 and a holder 26 for an objective 8. One of the first or second housing shells 16 or 18 defines a recess 28 into which microscope stage 10 can be inserted. By means of adjusting knob 12, the height of microscope stage 10 can be adjusted. For this purpose, an opening 30 is provided for adjusting knob 12 in the first and the second housing shell 16 and 18. When the stand 4 is assembled, it is possible to differentiate between the first and second housing shells by the fact that a groove 32 extends along the connection between the first and the second housing shell 16 and 18.

The exploded view of stand 4 in FIG. 4 shows stand 4 to consist of the first and the second housing shell 16 and 18 and base 22. Connecting means 34 is attached to each of housing shells 16 and 18. Connecting means 34 are kept together and connected by, for example, a screw 54 (see FIG. 3). Moreover, at the edges of the first and second housing shell 16 and 18 there are provided positioning elements 58, 58a and 58b whereby it is possible to align first an second housing shells 16 and 18 before said shells are screwed together. Each of housing shells 16 and 18 forms at the inner edge of base part 20 several threaded openings 60 (see FIG. 3) that are aligned with openings 62 in stand base cover 22. Screws 61 are screwed into openings 62 in stand base cover 22 to fasten base 22 to the first and second housing shell 16 and 18. In addition, in the region of base part 10 of stand 4, positioning elements 58 and 58a of the first and second housing shell 16 and 18 are configured so that by means of screws 61 for the fastening of base 22, the first and second housing shell 16 and 18 can also be fastened. Moreover, inside second housing shell 18 there is provided at least one holding means 70 for the battery or the storage battery. A fastening element 72 for the switch is also provided here.

Figure 5:
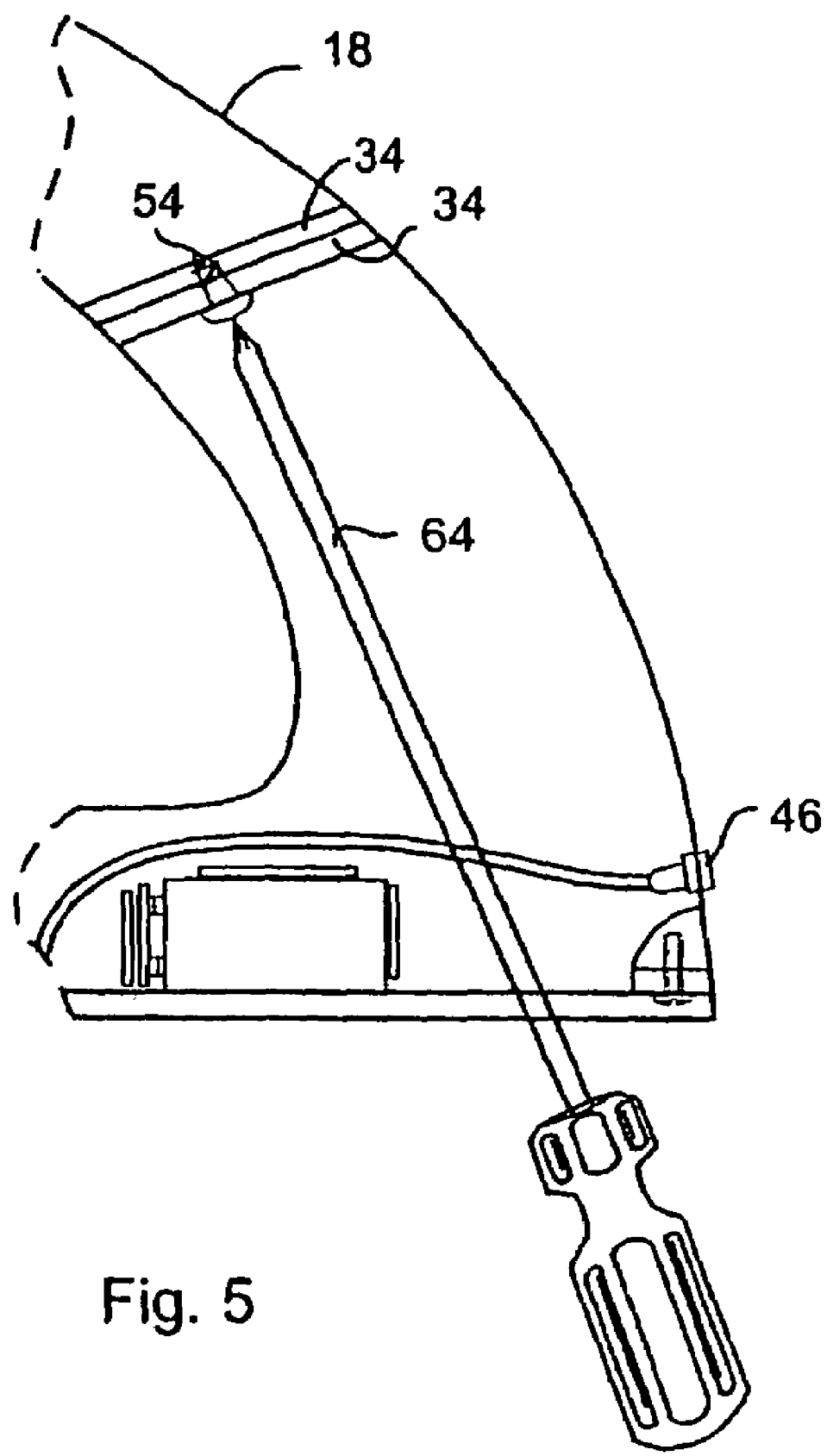
FIG. 5 is a representation showing the cooperation of the mounting means with the connecting means for the first and second housing shell.

FIG. 5 shows a detailed representation in which the cooperation of a mounting means 64 with the connecting means 34 for the first and second housing shell 16 and 18 can be seen. Mounting means 64 is configured in a manner such that it extends through the base part 20 of stand 4 toward connecting means 34 for the purpose of tightening screw 54 that connects the first and second housing shell 16 and 18 to each other. The first and second housing shell 16 and 18 are connected before stand base cover 22 is connected with the first and second housing shell 16 and 18.

Figure 6:
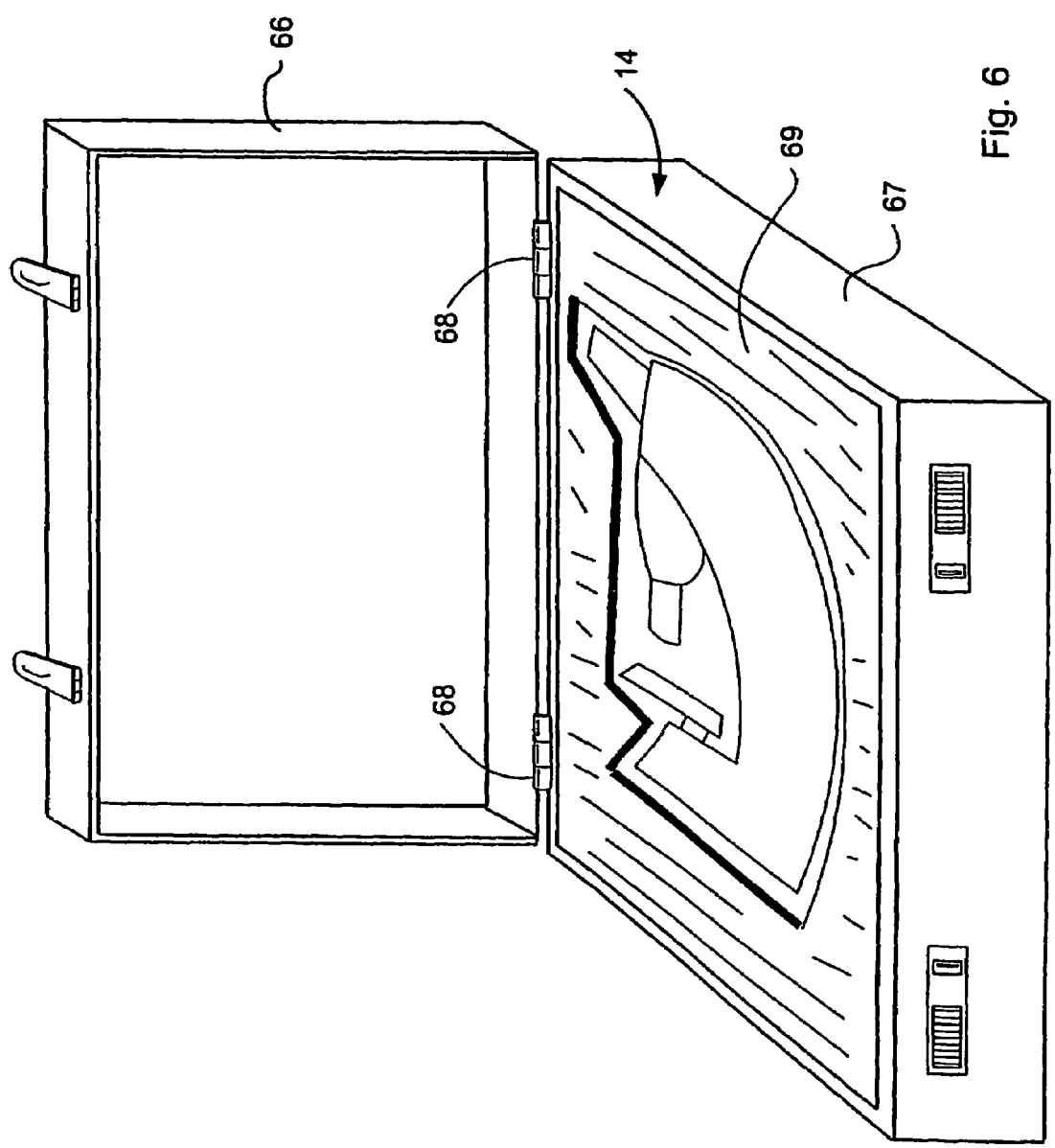
FIG. 6 is a representation of the carrying case for the microscope.

Carrying case 14 for microscope 2 is shown in FIG. 6. Carrying case 14 enables microscope 2 to be transported. For the user, this possibility is advantageous because it provides safe transport for field tests. Carrying case 14 comprises a first and a second part 66 and 67 connected by a hinge 68. In carrying case 14, in each of the first and second part, there is provided a protective transport device 69 partly configured as a negative impression of microscope 2. When carrying case 14 is closed, the entire microscope 2 is enclosed by the negative impression. Protective transport device 69 is made of an appropriate polymeric material. Carrying case 14 has a height $H_K$, a width $B_K$ and a depth $T_K$ all of which are greater than the outer dimensions of microscope 2.

The invention was described in reference to a particular embodiment. Naturally, however, modifications and changes can be made without thereby exceeding the protective scope of the following claims.

I claim:

1. A microscope with a stand comprising a first housing shell and a second housing shell, the stand carrying an adjustable microscope stage, the first and second housing shells defining a base part on which the stand rests, said stand having a generally C-shaped configuration, a stand base cover which closes the base part of the stand toward the outside, and at least one connecting means for the first and the second housing shells, the connecting means being inaccessible from outside the stand when the stand base cover is in place.

2. The microscope as defined in claim 1, wherein said first and second housing shells are cooperating, and one of the cooperating first and second housing shells define a recess capable of receiving the microscope stage, the height of which can be adjusted with an adjusting knob, an opening being provided for the adjusting knob in the first and the second housing shells.

3. The microscope as defined in claim 1, wherein a fastener is provided for connecting the connecting means for the first and the second housing shells and that tightening of said fastener is performed through the base part of the stand so that the outer contour of the stand is undisturbed.

4. The microscope as defined in claim 1, wherein the stand comprises an opening for receiving an eyepiece tube and a holder for at least one objective.

5. The microscope as defined in claim 4, further comprising an eyepiece, said eyepiece in the eyepiece tube defining a first optical axis and that at least one of the objectives in a working position defines a second optical axis of the objective and that the first optical axis of the eyepiece and the second optical axis of the objective are disposed at an obtuse angle ($\alpha$).

6. The microscope as defined in claim 5, wherein the obtuse angle ($\alpha$) is formed between the second optical axis of the at least one objective and the first optical axis of the eyepiece.

7. The microscope as defined in claim 1, wherein the interior of the first housing shell or the second housing shell is provided with an optical deflection means configured so that the image of a specimen seen by the user has the same orientation as the specimen itself.

8. The microscope as defined in claim 7, wherein said optical deflecting means is a mirror system or a prism.

9. The microscope as defined in claim 1, wherein the dimensions of the stand together with the microscope stage and the adjusting knob are smaller than those of a conventional carrying case.

10. The microscope as defined in claim 9, wherein said carrying case comprises a first and a second part, each of the first and second parts of the carrying case having a protective transport device for the microscope, said protective transport devices being configured as part of a negative impression of the microscope.

11. The microscope as defined in claim 1, further comprising a holder for an objective and a single objective disposed in the holder.

12. The microscope as defined in claim 1, further comprising a holder for an objective turret and an objective turret disposed in the holder.

* * * * *